United States Patent
André et al.

(10) Patent No.: US 9,243,159 B2
(45) Date of Patent: *Jan. 26, 2016

(54) DISPERSION COMPRISING METALLIC, METAL OXIDE OR METAL PRECURSOR NANOPARTICLES, A POLYMERIC DISPERSANT AND A SINTERING ADDITIVE

(71) Applicant: AGFA-GEVAERT, Mortsel (BE)

(72) Inventors: Xavier André, Mortsel (BE); Dirk Bollen, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 89 days.

This patent is subject to a terminal disclaimer.

(21) Appl. No.: 14/363,338

(22) PCT Filed: Dec. 18, 2012

(86) PCT No.: PCT/EP2012/075936
§ 371 (c)(1),
(2) Date: Jun. 6, 2014

(87) PCT Pub. No.: WO2013/092576
PCT Pub. Date: Jun. 27, 2013

(65) Prior Publication Data
US 2014/0329067 A1    Nov. 6, 2014

Related U.S. Application Data

(60) Provisional application No. 61/578,251, filed on Dec. 21, 2011.

(30) Foreign Application Priority Data

Dec. 21, 2011  (EP) ..................... 11194790

(51) Int. Cl.
| | |
|---|---|
| H01B 1/22 | (2006.01) |
| C09D 11/52 | (2014.01) |
| C08K 5/09 | (2006.01) |
| C08K 5/092 | (2006.01) |
| B05D 5/12 | (2006.01) |
| C09D 5/24 | (2006.01) |
| C09D 7/12 | (2006.01) |

(52) U.S. Cl.
CPC *C09D 11/52* (2013.01); *B05D 5/12* (2013.01); *C08K 5/09* (2013.01); *C08K 5/092* (2013.01); *H01B 1/22* (2013.01); *C09D 5/24* (2013.01); *C09D 7/1266* (2013.01); *Y10T 428/24917* (2015.01); *Y10T 428/31942* (2015.04)

(58) Field of Classification Search
CPC .............. H01B 1/02; H01B 1/20; H01B 1/22; C09D 11/03; C09D 11/30; C09D 11/326; C09D 11/52; C08K 5/09; C08K 5/092; C08K 5/095; C08L 59/00; C08L 71/00

See application file for complete search history.

(56) References Cited

U.S. PATENT DOCUMENTS

| | | | |
|---|---|---|---|
| 2007/0154644 A1 | 7/2007 | Hwang et al. | |
| 2008/0078302 A1* | 4/2008 | Lee ...................... | B22F 1/0022 106/31.13 |
| 2009/0053415 A1* | 2/2009 | Isobe .................... | C09D 11/52 427/256 |
| 2009/0198009 A1* | 8/2009 | Matsuki ................ | B82Y 30/00 524/440 |
| 2009/0242854 A1* | 10/2009 | Li ........................ | C09D 11/101 252/519.33 |
| 2009/0321689 A1* | 12/2009 | Harada ............... | B01F 17/0007 252/513 |
| 2010/0040846 A1* | 2/2010 | Bahnmuller .......... | C09D 11/52 428/208 |

FOREIGN PATENT DOCUMENTS

| | | | | |
|---|---|---|---|---|
| EP | 2 147 733 A1 | | 1/2010 | |
| GB | 2479412 A | * | 10/2011 | ............... C09D 5/24 |
| JP | 2009074171 A | * | 4/2009 | |
| WO | 2011/052966 A2 | | 5/2011 | |
| WO | WO 2011052966 A2 | * | 5/2011 | ............... B22F 3/22 |

OTHER PUBLICATIONS

Official Communication issued in International Patent Application No. PCT/JP2012/075936, mailed on Feb. 22, 2013.
Andre et al., "A Dispersion Comprising Metallic, Metal Oxide or Metal Precursor Nanoparticles, A Polymeric Dispersant and a Thermally Cleavable Agent", U.S. Appl. No. 14/363,336, filed Jun. 6, 2014.
Andre et al., "Dispersion Comprising Metallic, Metal Oxide or Metal Precursor Nanoparticles", U.S. Appl. No. 13/996,399, filed Sep. 25, 2013.
Andre et. al.; "A Metallic Nanoparticle Dispersion"; U.S. Appl. No. 14/405,207, filed Dec. 3, 2014.

* cited by examiner

*Primary Examiner* — Mark Kopec
*Assistant Examiner* — Matthew R Diaz
(74) *Attorney, Agent, or Firm* — Keating and Bennett, LLP

(57) ABSTRACT

A dispersion includes metallic, metal oxide, or metal precursor nanoparticles; a thermally cleavable polymeric dispersant; an optional dispersion medium; and a thermally cleavable agent. Pastes, coated layers, and patterns may contain the dispersion. A method for producing the specific thermally cleavable dispersant and for producing the metallic nanoparticle dispersions. The dispersions allow the reduction or avoidance of organic residue in coated layers and patterns on substrates, the use substrates of low thermal resistance, and faster processing times.

15 Claims, No Drawings

DISPERSION COMPRISING METALLIC, METAL OXIDE OR METAL PRECURSOR NANOPARTICLES, A POLYMERIC DISPERSANT AND A SINTERING ADDITIVE

CROSS-REFERENCE TO RELATED APPLICATIONS

This application is a 371 National Stage Application of PCT/EP2012/075936, filed Dec. 18, 2012. This application claims the benefit of U.S. Provisional Application No. 61/578,251, filed Dec. 21, 2011, which is incorporated by reference herein in its entirety. In addition, this application claims the benefit of European Application No. 11194790.9, filed Dec. 21, 2011, which is also incorporated by reference herein in its entirety.

BACKGROUND OF THE INVENTION

1. Field of the Invention

The present invention relates to compositions comprising a conductive dispersion and a specific carboxylic acid as sintering additive allowing a reduction of the curing time and/or a lowering of the curing temperature when applied to a substrate.

The invention also relates to a process for making such compositions, to coated layers or patterns prepared from such compositions and to curing processes of these coated layers or patterns.

2. Description of the Related Art

The interest in metallic nanoparticles has increased during the last decades due to their unique properties when compared to the bulk properties of a given metal. For example, the melting point of metal nanoparticles decreases with decreasing particle size making them of interest for printed electronics, electrochemical, optical, magnetic and biological applications.

The production of stable and concentrated metallic nanodispersions that can be coated or printed, for example by inkjet printing, with a high throughput is of great interest as it enables the preparation of electronic devices at low costs.

Usually, the production of metallic nanodispersions is carried out in water or organic solvents by the polyol synthesis methodology (as disclosed in Mat. Chem. Phys. 114, 549-555), by a derivative of the polyol synthesis methodology, or by an in-situ reduction of metallic salts in the presence of various reducing agents. Such methods are disclosed in for example US2010143591, US2009142482, US20060264518 and US20080220155, EP-As 2147733, 2139007, 803551, 2012952, 2030706, 1683592, 166617, 2119747, 2087490 and 2010314, WOs 2008/151066, 2006/076603, 2009/152388 and 2009/157393.

Among others, the dilution of metallic nanodispersions, usually less than 1 wt. % of metallic particles, is a severe drawback. Indeed, such highly diluted metallic nanodispersions cannot directly be used to prepare a conductive coating or a printing fluid that requires at least 5 wt. % of metallic nanoparticles based on its composition. An additional concentration step of the diluted metallic nanodispersions is then necessary before it can be used in the preparation of such coating or printing fluids.

WO2006/072959 discloses the production of silver nanoparticles dispersions up to 35 wt. % in water but the method still requires additional purification and isolation steps that impart drastically their industrialization and the scope of their applications.

A metallic nanodispersion typically comprises metallic, metal oxide or metal precursor nanoparticles, a polymeric dispersant and optionally a dispersion medium. The polymeric dispersant is a substance that promotes the formation and stabilization of a dispersion of particles in a dispersion medium. Dispersed particles may have a tendency to re-agglomerate after the dispersing operation, due to mutual attraction forces. The use of dispersants counteracts this re-agglomeration tendency of the particles. The dispersant has to meet particularly high requirements when used for coating fluids and printing inks. Non-stable dispersions may lead to irreversible phase separation causing among other the clogging of the coating or print heads, which are usually only a few micrometers in diameter. In addition, metallic particles agglomeration and the associated blockage of the coating/print heads has to be avoided in the standby periods of the system.

In the case of metallic nanoparticles dispersions, their tendency to re-agglomerate, to flocculate or to precipitate (leading to phase separation) is enhanced due to their high bulk density ($\rho$) when compared to other organic or inorganic particles like organic pigments ($\rho$=1.2-2.0 g/cm$^3$), inorganic pigments ($\rho$=4.2 g/cm$^3$ for titanium dioxide) or inorganic filler ($\rho$=4.4 g/cm$^3$ for barium sulphate). For example, the bulk densities at room temperature of silver, copper and gold are respectively 10.49, 8.94 and 19.30 g/cm$^3$.

Polymeric dispersants typically contain in one part of the molecule so-called anchor groups, which adsorb onto the metallic particles to be dispersed. In a spatially separate part of the molecule, polymeric dispersants have polymer chains compatible with the dispersion medium (or liquid vehicle) and all the ingredients present in the final coating or printing fluids. Typical polymeric dispersants include homopolymer or random or block copolymers of various topologies and architectures (linear, graft, hyper branched).

Metallic nanoparticles dispersions usually comprise polymeric dispersants selected from homopolymers and copolymers based on acrylic acid, methacrylic acid, vinyl pyrrolidinone, vinyl butyral, vinyl acetate or vinyl alcohol.

EP-A 2147733 discloses a method for producing a silver ink from a dispersion containing a polymeric dispersant, the dispersant comprising a hydrophilic segment and a polyalkyleneimine chain.

US2009/0242854 describes compounds to improve the stability of metallic conductive inks, which comprise metallic nanoparticles, a polymeric dispersant and a solvent, wherein the respective boiling point may be less than 150° C. The polymers may have a head group and a tail group on a nanoparticle, wherein the head group may include compounds such as amines, cationic alkylammonium groups, carboxylic acids, sulfonic acids and phosphoric acid groups. Other additives may also be present in the dispersion, such as dimethyl sulfoxide and oxy-bis-ethanol. Compounds such as BYK-349, BYK-DYNWET800, isostearyl ethylimidazolinium ethosulphate and alcohols were added to some of the inks to promote good wetting properties and adhesion properties.

EP-A 10196244.7 (filed on 21 Dec. 2010) describes a conductive ink comprising metallic nanoparticles and a polymeric dispersant which comprises an anchor group with affinity for the metallic nanoparticles, wherein the polymeric backbone has a 95 wt. % decomposition at a temperature below 300° C., thus allowing to be used in printing processes with lower curing temperatures.

The metallic nanodispersions are used to coat or print metallic patterns on a substrate. Typically, after applying the patterns on the substrate a sintering step, also referred to as curing step, at elevated temperatures is carried out to induce/ enhance the conductivity. It has been found that the organic components of the nanodispersions, for example the polymeric dispersants, may reduce the sintering efficiency and thus the surface conductivity. For this reason, higher sintering temperatures and longer sintering times are often required to decompose the organic components.

Typical polymeric dispersants, such as those described above, are characterized by a full decomposition temperature of at least 350° C. Therefore, the patterns coated or printed with the fluids or inks comprising such polymeric dispersants require a sintering step at elevated temperatures to be sure that most of the organic components in the coated or printed layers are decomposed.

Such high sintering temperatures are not compatible with common polymer foils, such as polyethylene terephthalate (PET) or polycarbonate, which have relatively low glass transition temperatures. This restricts the choice to more expensive polymers such as polyimide.

In order to enlarge the application of conductive compositions to thermo-sensitive substrates it is desirable to obtain conductive compositions which require lower temperatures and times for the curing step, with good or improved conductivity values. Additionally, it is also desirable to develop a curing process to take advantage of the improved properties of the compositions, i.e. a high throughput coating or printing process.

SUMMARY OF THE INVENTION

Preferred embodiments of the present invention provide compositions that allow a reduction of the curing time and/or a lowering of the curing temperature while maintaining or even improving their conductivity when applied to a substrate.

A preferred embodiment of the present invention is realised by providing a dispersion and a carboxylic acid as sintering additive as defined below.

Another preferred embodiment of the invention provides a method for making the conductive compositions.

This preferred embodiment is realised by providing a method for making the compositions by providing a polymeric dispersion and adding a carboxylic acid to the dispersion, as defined below.

Another preferred embodiment of the present invention provides conductive layers or patterns applied to a substrate.

This preferred embodiment is realised by providing coated layers or patterns comprising the compositions of the present invention, as defined below.

A further preferred embodiment of the present invention provides a process for curing the compositions of the present invention when applied to a substrate.

This preferred embodiment is realised by providing a process for curing as defined below.

Further advantages and embodiments of the present invention will become apparent from the following description and the dependent claims.

DETAILED DESCRIPTION OF THE PREFERRED EMBODIMENTS

A preferred embodiment of the present invention relates to compositions comprising:
  a dispersion comprising a) metallic, metal oxide or metal precursor nanoparticles, b) a polymeric dispersant (PD) comprising (i) a polyacetal or a polyacetal/polyether backbone, and (ii) an anchor group with affinity for the metallic, metal oxide or metal precursor nanoparticles that is chemically bonded to the polyacetal or polyacetal/polyether backbone, the PD having 95 wt. % decomposition at a temperature below 300° C., c) an optional dispersion medium, and
  a sintering additive (SA), characterized in that SA is a dicarboxylic acid according to the formula HOOC—$X_a$—COOH, wherein a is 0 or 1 and X is an optionally substituted $C_1$-$C_3$ alkylene group.

Metallic, Metal Oxide or Metal Precursor Nanoparticles

A composition according to a preferred embodiment of the present invention comprises a dispersion comprising metallic nanoparticles, metal oxide nanoparticles or metal precursor nanoparticles.

The metallic nanoparticles comprise one or more metals in elemental or alloy form. The metal is preferably selected from the group consisting of silver, gold, copper, nickel, cobalt, molybdenum, palladium, platinum, indium, tin, zinc, titanium, chromium, tantalum, tungsten, iron, rhodium, iridium, ruthenium, osmium, aluminium and lead. Metallic nanoparticles based on silver, copper, molybdenum, aluminium, gold, or a combination thereof, are particularly preferred.

Other preferred nanoparticles are based on Cupper Indium Gallium or Cupper Indium Gallium Selenide (CIGS). Other preferred nanoparticles, are based on selenides or sulfides, such as for example CdS, CdSe, ZnS, ZnSe, PbS, PbSe, CdTe, CdTeSe or PbSe may also be used.

Preferred metal oxide nanoparticles are based on indium oxide, indium tin oxide, tin oxide, titanium oxide, zirconium oxide, wolfram oxide, molybdenum oxide, cadmium oxide or zinc oxide. Also doped metal oxide nanoparticles such as ZnO:Al, $SO_2$:F or $SO_2$:Sb may be used. Cupper Indium Gallium oxides and copper oxides may also be used as precursors for Cupper Indium Gallium Selenide nanoparticles.

The term "precursor" refers to the ability of converting it to the desired material by means of an additional step such as the reduction of metal oxides to metals or the selenization of Cupper Indium Gallium to CIGS.

The term "nanoparticles" refers to dispersed particles having an average particle size below 100 nm at the end of the dispersion preparation. The metallic, metal oxide or metal precursor nanoparticles have an average particle size at the end of the dispersion preparation of less than 100 nm, preferably less than 50 nm, more preferably less than 20 nm.

Before the dispersion preparation step, the metal, metal precursor or metal oxide particles are typically available as powders or flakes with an average particle size often above 100 nm. Their particle size must then be lowered to the nanoparticles range during the dispersion preparation.

Polymeric Dispersant

A dispersant according to a preferred embodiment of the present invention comprises a matrixophilic polymer backbone part, which confers the steric stabilization in the dispersion medium, and anchor groups with affinity for the metallic, metal oxide or metal precursor nanoparticles that are chemically bonded, preferably covalently bonded, to the polymer backbone. The anchor groups ensure optimal stabilization of the nanoparticles.

The polymer backbone has to ensure a 95 wt. % thermal decomposition of the polymeric dispersant at a temperature preferably below 300° C. For that reason, the polymer backbone is a polyacetal backbone or a polyacetal/polyether backbone.

The polymeric dispersant has complete decomposition at a temperature below 310° C. and a 95 wt. % decomposition at a temperature below 300° C., preferably below 290° C., more preferably below 280° C., as measured by Thermal Gravimetric Analysis (TGA).

A 95 wt. % decomposition means that 95 wt. % of the polymeric dispersant is decomposed and evaporates from the coated or printed layers.

The thermal decomposition may occur in 1, 2 or 3 steps. The main decomposition, i.e. at which at least 75 wt. % of the polymeric dispersant is decomposed, preferably occurs between 100° C. and 300° C., more preferably between 125° C. and 250° C., most preferably between 150° C. and 240° C. Typically, a derivative weight loss curve is used to derive the temperature at which the main decomposition occurs. The highest peak in such a derivative weight loss curve, i.e. the main decomposition, is observed preferably between 100° C. and 300° C., more preferably between 125° C. and 250° C., most preferably between 150° C. and 240° C.

As aromatic polyethers have a higher thermal stability compared to aliphatic polyethers, the polyether fragment of the polymeric backbone of the dispersant preferably comprise no, or only a minor amount of aromatic groups.

Particularly preferred, the polyether fragment of the polymeric backbone of the dispersant is an aliphatic polyether backbone.

Examples of preferred polyacetal backbones have the following structures or can be combination thereof, produced by the polymerization or copolymerization of cyclic acetal monomers, such as trioxane, dioxolane, and dioxepane.

—(CH$_2$—O)$_n$—
—(CH$_2$—CH$_2$—O—CH$_2$—O)$_n$—
—(CH$_2$—CH$_2$—CH$_2$—O—CH$_2$—O)$_n$—
—(CH$_2$—CH$_2$—CH$_2$—CH$_2$—O—CH$_2$—O)$_n$— wherein is n is an integer between 14 and 500.

Examples of preferred polyether fragments for including in the polyacetal backbone have the following structures, —(CH$_2$—CH$_2$—O)$_n$—
—(CH$_2$—CHCH$_3$—O)$_n$—
—(CH$_2$—CH$_2$—CH$_2$—O)$_n$—
—(CH$_2$—CH$_2$—CH$_2$—CH$_2$—O)$_n$—
—(CH$_2$—CH$_2$—CH$_2$—CH$_2$—CH$_2$—O)$_n$—
—(CH$_2$—CH$_2$—CH$_2$—CH$_2$—CH$_2$—CH$_2$—O)$_n$— wherein is n is an integer between 14 and 500.

A particularly preferred polyacetal or polyacetal/polyether backbone is represented by Formula I,

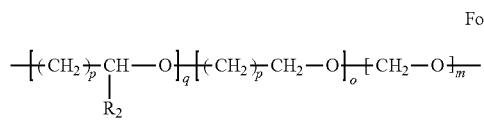

Formula I wherein m is an integer between 1 and 500,
o is an integer between 0 and 340,
q is an integer between 0 and 250,
p is an integer between 1 and 7;
m+o+q is an integer between 14 and 500;
R$_2$ represents a hydrogen, a methyl or an optionally substituted alkyl group.

Anchor groups for the metallic, metal precursor and metal oxide nanoparticles may comprise low molecular weight (MW<300) aliphatic amines or aromatic amines, thioethers, thiols, disulfides, optionally substituted aryl or aralkyl groups, 2-pyrrolidone, amide, ester, acrylic, S-containing heteroaromatic compounds, N-containing heteroaromatic compounds, optionally substituted thiiranes, thioacetals, oxathioacetals, sultams, thiophenes, benzothiophenes, cyclic and alicyclic amines, lactams, imidazolidones, oxazolidinones, hydantoins, urazoles, 2H-azirines, 3-pyrrolines, 2-pyrrolines, 1-pyrrolines, maleimides, 2-isoxazolines, 2-oxazolines, 2-imidazolines, pyrazolines, pyrroles, imidazoles, benzimidazoles, pyrazoles, indazoles, 1,2,3-triazoles, 1,2,3-benzotriazoles, 1,2,4-triazoles, tetrazoles, 1-substituted tetrazoles, 5-substituted tetrazoles, 1,5-disubstituted tetrazoles, optionally substituted imidazol-2-ones, benzimidazol-2-ones, 1,3-oxazoles, benzoxazoles, isoxazoles, 1,3-thiazoles, benzothiazoles, 1,3,4-oxadiazoles, 1,2,4-oxadiazoles, 1,3,4-thia-diazoles, indoles, oxindoles, indolines, carbazoles, aza-indoles, isoindoles, indolizines, indolizinones, pyridines, dihydropyridines, 2-pyridones, pyrimidines, 1,3,5-triazines, quinolines, tetrahydroquinolines, 1,2-dihydroquinolines, iso-quinolines, 3,4-dihydroisoquinolines, 1,8-napthyridines, quinazolines, 4-quinolones, 1,3-imidazoles, thioamides, morpholine derivatives, piperazine, triazaindolizines, or nucleic acid derivatives such as adenine, guanine, cytosine, thymine, uracile, or a combination thereof.

Preferably, the anchor groups comprise a S and/or N containing heteroaryl.

More preferably, the anchor groups are selected from the group of heteroaryls according to Formulae II, III, IV or V.

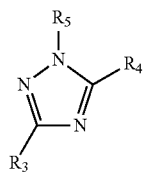

Formula II

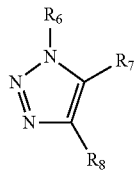

Formula III

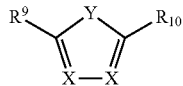

Formula IV

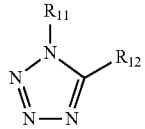

Formula V wherein
R$_3$, R$_4$, R$_7$, R$_8$, R$_9$, R$_{10}$, and R$_{12}$ independently represent a halogen, an optionally substituted thiol, an hydroxyl, a carboxylic acid, an aldehyde, an ester, an amide, a primary amine, a secondary amine, a tertiary amine, an optionally substituted alkyl, aryl, aralkyl or alkylene group; R$_7$ and R$_8$ can be optionally linked and form a ring structure;
R$_5$, R$_6$, R$_{11}$ represent independently a halogen, an optionally substituted thiol, a carboxylic acid, a primary amine, a secondary amine, a tertiary amine, an optionally substituted alkyl, aryl or aralkyl group;
X independently represents a —N—, a —CH—, or a —C(CR$_{13}$)— and where R$_{13}$ represents a methyl, an optionally substituted alkyl, aryl or aralkyl group and where X can optionally be linked to R$_9$ or R$_{10}$ and form a ring structure;
Y represents oxygen, sulphur, or —NR$_{14}$— wherein R$_{14}$ represents a methyl or an optionally substituted alkyl, aryl or aralkyl group.

Particularly preferred anchor groups include 2,5-dimercapto-1,3,4-thiadiazole, 1-(2-dimethylamino-ethyl)-5-mercapto-tetrazole, 5-mercapto-1-methyltetrazole, 3-amino-5-mercapto-1,2,4-triazole and 1-(2-dimethylamino-ethyl)-5-mercapto-tetrazole.

The polymeric dispersants according to preferred embodiment of the present invention are preferably produced by any of the following methods:
- a ring-opening polymerization, a ring-opening copolymerization or any other polymerization or copolymerization of cyclic acetals or oxiranes in the presence of the anchor group;
- a post-functionalization of a polyacetal or polyacetal/polyether precursor by post-polymerization procedures including the quenching or derivatization with the anchor group molecules or any molecule bearing the anchor group moiety, as described in Macromol. Symp. 1994, 85, 167-174.

When carrying out the polymerization in the presence of the anchor group, the first method described above, the anchor groups may be chemically bonded to one or both ends (i.e. the telechelic positions) of the polymeric backbone or may be incorporated into the polymeric backbone. When carrying out a post-functionalization, the second method described above, the anchor groups will preferably be chemically bonded to one or both ends of the polymeric backbone.

The anchor groups according to Formulae II to V may be chemically bonded to the polymer backbone through for example the N-atoms of the heterocycles or the $R_3$ to $R_{12}$ substituents.

A particularly preferred polymeric dispersant comprises an anchor group with affinity for metallic, metal oxide or metal precursor nanoparticles according to Formula II, III, IV or V, or a combination thereof, that is chemically bonded to a polymeric backbone according to Formula I.

Preferably, this particularly preferred polymeric dispersant is prepared by a reaction between:
a) 90 to 99.4 mol % of a monomer represented by Formula VI, VII or VIII, or a combination thereof;

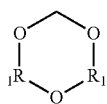

Formula VI

Formula VII

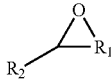

Formula VIII wherein
$R_1$ represents a $(CH_2)_p$ unit with p is an integer between 1 and 7 and $R_2$ represents an hydrogen, a methyl or an optionally substituted alkyl group;
b) 0.1 to 10 mol % of a metallic anchor group according Formula II, III, IV or V, or a combination thereof;
c) 0.1 to 0.5 mol % of a polymerization initiator selected from the groups consisting of a proton acid, a Lewis acid and an oxonium compound, or of an anionic initiator selected from the group consisting of an alcoholate and an organanometallic compound.
The mol % referred to above is based on the feed mixture.

Suitable polymerization initiators are trifluoromethanesulphonic acid, methanesulphonic acid, perchloric acid, acetic anhydride, boron trifluoride etherate, boron trifluoride methyl etherate, boron trifluoride diethyl etherate, boron trifluoride dibutyl etherate, boron trifluoride methyl tert-butyl etherate, triethyloxonium tetrafluoroborate, triethyloxonium hexachloroantimonate, triethyloxonium hexafluorophosphate, antimony salts such as antimony chloride, diethylaluminum chloride, ethyl aluminum dichloride, trialkyl aluminum, metal halides such as aluminum chloride, zinc chloride, titanium tetrachloride, sodium alkoxide, potassium alkoxide, alkyl or aryl lithium, alkyl or aryl sodium, alkyl or aryl potassium, alkyl magnesium bromide, sodium naphthalene, aluminum alkoxide, magnesium alkoxide, beryllium alkoxide, or ferric alkoxide.

The polymeric dispersant according to a preferred embodiment of the present invention has an average numerical molecular weight Mn of less than 15000 Da, more preferably less than 8000 Da. In an even more preferred embodiment, the average numerical molecular weight Mn is comprised between 1500 and 6000 Da.

Upon completion of the reaction described above, free anchor groups, i.e. anchor groups that are not chemically bonded to the polymer backbone, may be present in the resulting reaction product. Such a reaction product, i.e. polymeric dispersant according to a preferred embodiment of the present invention and free anchor groups may be used as such to prepare the nanodispersions according of the present invention when the amount of free anchor groups is not too high.

In a preferred embodiment less than 10 mol % of free anchor groups is present in the reaction product.

Dispersion Medium

The dispersion medium used in the metallic nanoparticles dispersion according to a preferred embodiment of the present invention is absent or is preferably a non-aqueous liquid. A non-aqueous liquid may comprise minor amounts of water, preferably less than 10 wt %, more preferably less than 5 wt %. The dispersion medium may consist of an organic solvent or a combination of organic solvents. Suitable organic solvents include alcohols, aromatic hydrocarbons, ketones, esters, aliphatic hydrocarbons, higher fatty acids, carbitols, cellosolves, and higher fatty acid esters. Suitable alcohols include methanol, ethanol, propanol and 1-butanol, 1-pentanol, 2-butanol, t-butanol. Suitable aromatic hydrocarbons include toluene, and xylene. Suitable ketones include methyl ethyl ketone, methyl isobutyl ketone, 2,4-pentanedione and hexa-fluoroacetone. Also glycol, glycolethers, N-methylpyrrolidone, N,N-dimethylacetamid, N,N-dimethylformamid may be used. In a preferred embodiment, the use of 1-methoxy-2-propanol, methanol, ethanol and isopropanol is particularly preferred. In another preferred embodiment, the metallic nanoparticles dispersion can be solvent-free and is a homogeneous viscous paste.

Sintering Additives

It has been observed that when certain carboxylic acids are added to the above mentioned dispersion, the curing temperature may be lowered and the curing time reduced of coatings and/or patterns prepared from a composition comprising the dispersion and the carboxylic acids.

The sintering additives (SA) according to a preferred embodiment of the present invention are dicarboxylic acids with the formula HOOC—$X_a$—COOH, wherein a is 0 or 1 and X is an optionally substituted $C_1$-$C_3$ alkylene group, i.e. methylene, ethylene, n-propylene or i-propylene group. The $C_1$-$C_3$ alkylene group may be linear or branched.

In a preferred embodiment, the SA has the formula HOOC—(CH$_2$)$_b$—COOH, wherein b is 0, 1, 2 or 3. In a preferred embodiment, the dicarboxylic acid is oxalic acid (b=0), malonic acid (b=1), succinic acid (b=2) or glutaric acid (b=3). In a most preferred embodiment, the dicarboxylic acid is oxalic acid (b=0).

For comparative purposes other carboxylic acids, such as the mono-carboxylic acids, formic acid and ascorbic acid, and also the adipic acid, a dicarboxylic acid, were tested.

The SA preferably has a solubility in the optional dispersion medium of preferably at least 0.1 wt %, more preferably at least 1 wt %, most preferably of at least 2.5 wt % in the optional dispersion medium.

Preferred examples are shown in Table 1.

TABLE 1

| Product | SA |
| --- | --- |
| Oxalic Acid (b = 0) | SA-01 |
| Malonic Acid (b = 1) | SA-02 |
| Succinic Acid (b = 2) | SA-03 |
| Glutaric Acid (b = 3) | SA-04 |
| Formic acid | SA-05 |
| Ascorbic acid | SA-06 |
| Adipic Acid | SA-07 |

The SA according to a preferred embodiment of the present invention are preferably directly soluble in the dispersion medium or in the dispersion media. If the thermally cleavable agents according to a preferred embodiment of the present invention are not directly soluble, they should be solubilized firstly in a polar organic medium that is compatible with the dispersion medium or media. Examples of polar organic solvents are alcohols. The polar organic medium wherein the TCA is solubilized is than added to the dispersion medium.

Preparation Nanoparticles Dispersion

Nanoparticles dispersions are prepared by dispersing the metal(s), the metal oxide(s) or the metal precursor(s) in the presence of the polymeric dispersant and the optional dispersion medium. Dispersing methods include precipitating, mixing or milling or a combination thereof. The experimental conditions such as temperature, process time, energy input, etc. depend on the methodology chosen. The dispersion process can be carried out in a continuous, batch or semi-batch mode.

Mixing apparatuses may include a pressure kneader, an open kneader, a planetary mixer, a dissolver, a high shear stand mixer, and a Dalton Universal Mixer. Suitable milling and dispersion apparatuses are a ball mill, a pearl mill, a colloid mill, a high-speed disperser, double rollers, a bead mill, a paint conditioner, and triple rollers. Many different types of materials may be used as milling media, such as glasses, ceramics, metals, and plastics. The dispersions may also be prepared using ultrasonic energy.

The term "nanoparticles" refers to dispersed particles having an average particle size below 100 nm at the end of the dispersion preparation. Before the dispersion preparation step, the metallic, metal precursor or metal oxide particles are typically available as powders, flakes, particles or aggregated particles. When their average size is above 100 nm, the dispersion step includes necessarily a down-sizing step including the actions of milling or de-aggregating until the particles size is lowered to the nanoparticles range. The conversion of metal precursor(s) or metal oxide(s) to metal(s) can be concomitant to the down-sizing step.

In a preferred embodiment, the nanoparticles dispersions of the present invention are prepared by an in-situ reduction under mixing of a metal precursor, a metal oxide, a metal salt or a combination thereof, in the presence of a reducing agent and the polymeric dispersant according to the present invention in the liquid vehicle.

In a preferred embodiment, the dispersion is a low viscous liquid comprising at least 1 wt. %, more preferably at least 5 wt. %, of metallic, metal oxide or metal precursor nanoparticles.

The weight ratio nanoparticles/polymeric dispersant is at least 1.0, more preferably between 3.0 and 9.0.

In another preferred embodiment, the dispersion is substantially solvent-free, i.e. less than 10 wt. %, preferably less than 5 wt. % of solvent. Such a substantially solvent-free dispersion is obtained as a high viscous homogenous paste after evaporation of the dispersion medium. The solvent-free dispersion preferably comprises between 50 and 90 wt. % of metal, metal oxide or metal precursor nanoparticles. More preferably, the solvent-free dispersion comprises at least 75 wt. % of nanoparticles.

The high viscous paste can be re-dispersed in water, in an organic solvent, or in a combination thereof resulting in a low viscous dispersion which can then be used as for example a printing fluid. The re-dispersing step may be carried out by magnetic or mechanical stirring or by mixing. In the re-dispersion step the mixing apparatuses described above may be used. The size of the nanoparticles does not vary during the re-dispersing step. Realizing a stable high viscous paste that can be re-dispersed is an advantage for storing and transporting. In addition, the high viscous paste can be re-dispersed in a variety of solvents, even water, resulting in an increased flexibility to choose the optimal solvent for a particular application.

Preferred nanoparticles comprise metallic silver, copper or aluminium and particularly preferred nanoparticles comprise metallic silver oxide. These particularly preferred nanoparticles may be prepared, for example, by the reduction of silver precursors or salts or a combination thereof by a reducing agent, in the presence of the polymeric dispersant (PD). Particularly preferred silver salts or silver precursors are silver oxide and silver acetate.

Preparation of Sintering Additives

The sintering agents (SA) are directly added to the metallic nanoparticles dispersion (MNPD) as a powder or as a solution in MOP.

Compositions

Preferred embodiments of the present invention relate to compositions comprising (a) a dispersion comprising metallic, metal oxide or metal precursor nanoparticles, a polymeric dispersant comprising a polyacetal or a polyacetal/polyether backbone and an anchor group with affinity for the metallic, metal oxide or metal precursor nanoparticles that is chemically bonded to the polyacetal or polyacetal/polyether backbone having 95 wt. % decomposition at a temperature below 300° C., and an optional dispersion medium, and (b) a sintering additive (SA), characterized in that the SA is a dicarboxylic acid with the formula HOOC—X$_a$—COOH, wherein a is 0 or 1 and X is an optionally substituted C$_1$-C$_3$ alkylene group.

The concentration of the dicarboxylic acid in the compositions may be expressed as the weight ratio of dicarboxylic acid to polymeric dispersant (SA/PD). It was observed that the presence of SA/PD above 1.5 wt:wt requires longer curing times at a given temperature or higher temperatures at a given curing time due to an excess of SA which needs to be removed. Moreover, it was also observed that in the conditions the quality of the coated layers was poorer, i.e. they present less homogeneity, which leads to unstable and/or lower conductivity values of the coated layer or patterns thereof. When the value of SA/PD was below 0.6 wt:wt there is mainly a negative effect on the curing conditions, i.e. it is required higher temperatures and/or longer curing time for complete degradation of the binder.

Thus, in a preferred embodiment the concentration of the dicarboxylic acid, expressed as the weight ratio of dicarboxylic acid to polymeric dispersant (SA/PD) in the conductive compositions, varies between 0.6 and 1.5, and more preferably between 0.8 and 1.2.

In another preferred embodiment, the dicarboxylic acid is oxalic acid or malonic acid. In a most preferred embodiment, the dicarboxylic acid is oxalic acid.

The compositions according to a preferred embodiment of the present invention are prepared by adding a dicarboxylic acid with the formula HOOC—$X_a$—COOH, wherein a is 0 or 1 and X is an optionally substituted $C_1$-$C_3$ alkylene group, to the metallic nanodispersion as described above by a process comprising the following steps:
- (a) providing a dispersion comprising metallic, metal oxide or metal precursor nanoparticles, a polymeric dispersant comprising a polyacetal or a polyacetal/polyether backbone and an anchor group with affinity for the metallic, metal oxide or metal precursor nanoparticles that is chemically bonded to the polyacetal of polyacetal/polyether backbone having 95 wt. % decomposition at a temperature below 300° C., and a dispersion medium, and
- (b) adding a sintering additive (SA) to the dispersion, characterized in that the SA is a dicarboxylic acid with the formula HOOC—$X_a$—COOH, wherein a is 0 or 1 and X is an optionally substituted $C_1$-$C_3$ alkylene group.

For the embodiment wherein the nanoparticle dispersion is a high viscous paste, as described above, the sintering additive SA is preferably added to the re-dispersed high viscous paste. Adding the sintering additive to the high viscous paste before solvent evaporation or before re-dispersing it, may induce partial decomposition of the polymeric dispersant present in the composition. Mixing methods used to re-disperse the high viscous paste may locally increase the temperature of the dispersion and thus cooling devices are preferably used for maintaining the temperature at maximum 40° C. For this embodiment, the composition is preferably prepared by a process comprising the following steps:
- providing a dispersion comprising (a) metallic, metal oxide or metal precursor nanoparticles, (b) a polymeric dispersant comprising a polyacetal or a polyacetal/polyether backbone and an anchor group with affinity for the metallic, metal oxide or metal precursor nanoparticles that is chemically bonded to the polyacetal of polyacetal/polyether backbone, the PD having a 95 wt. % decomposition at a temperature below 300° C., and (c) a first dispersion medium,
- removing the dispersion medium at least partially by evaporation thereby obtaining a high viscous paste,
- re-dispersing the high viscous paste in a second dispersion medium, wherein the first and second dispersion medium may be the same, and
- adding a sintering additive (SA) to the dispersion, characterized in that the SA is a dicarboxylic acid with the formula HOOC—$X_a$—COOH, wherein a is 0 or 1 and X is an optionally substituted $C_1$-$C_3$ alkylene group.

The compositions, according to a preferred embodiment of the present invention may be directly used as a coating solution or printing fluid. However, to optimize its coating or printing properties and depending on the application for which it is used, extra solvents and/or additives such as reducing agents, salts, wetting/levelling agents, rheology modifiers, or adhesion agents or tackifiers may be added to the low viscous nanoparticles dispersion or the re-dispersed paste after re-dispersion in a suitable solvent.

The thin layers or patterns printed or coated from the metallic compositions of the present invention can be rendered conductive at lower sintering temperatures compared to those obtained with conventional metallic compositions. Therefore, conductive thin layers or patterns made from the metallic compositions of the present invention can be coated or printed on flexible substrates that can not withstand thermal treatment at high temperature, such as for example PET.

Metallic layers or patterns may be realized by an inkjet method. The viscosity of the printing fluid measured at jetting temperature is preferably between 5 and 20 mPa·s, more preferably between 5 and 12 mPa·s.

The metallic layers or patterns may also be realized by any conventional printing techniques such as flexography, offset, gravure or screen printing or by any conventional coating technique such as spray coating, blade coating, slot die coating.

After the layers or patterns are applied on the substrate, a sintering step is carried out. During this sintering step, solvents evaporate, organic components decompose and the metallic particles sinter together. Once a continuous percolating network is formed between the metallic particles, the layers or patterns become conductive.

Conventional sintering is carried out by applying heat. The sintering temperature and time are of course dependent on the substrate used and on the composition of the conductive composition, or layer but is preferably below 200° C., more preferably below 180° C., most preferably 170° C. However, instead of or in addition to the conventional sintering by applying heat, alternative sintering methods such as exposure to an Argon laser, to microwave radiation, to UV radiation or to low pressure Argon plasma, photonic curing, plasma, electron beam or pulse electric current sintering may be used.

According to a preferred embodiment of the present invention, the sintering step for curing the compositions of the invention may be performed at a temperature below 200° C., preferably between 180° C. and 130° C., and more preferably at 170° C.

Moreover, according to a preferred embodiment of the present invention, the sintering time may be performed in less than 30 minutes, preferably between 2 and 20 minutes and more preferably between 3 and 10 minutes, depending on the selected temperature, substrate and composition of the conductive compositions.

Therefore, a preferred embodiment of the present invention also provides a curing process for the conductive compositions described above wherein the curing time is less than 30 minutes, preferably between 2 and 20 minutes and more preferably between 3 and 10 minutes, and the curing temperature is below 200° C., preferably between 180° C. and 130° C., and more preferably at 170° C.

The compositions according to preferred embodiments of the present invention allow to use lower curing temperatures than the prior art processes. In consequence it is possible to use polymeric substrates that can not withstand thermal treatment at high temperature, such as for example PET. The curing time may also be substantially reduced leading to the possibility of having higher production per hour than the prior art processes. The conductivity rates are maintained or even improved in certain cases.

The conductive layers or patterns may be used in various electronic devices or parts of such electronic devices as for example organic photo-voltaics (OPV's), inorganic photo-voltaics (c-Si, a-Si, CdTe, CIGS), OLED displays, OLED lighting, inorganic lighting, RFID's, organic transistors, thin film batteries, touch-screens, e-paper, LCD's, plasma, or electromagnetic shielding.

EXAMPLES

Materials

All materials used in the following examples were readily available from standard sources such as ALDRICH CHEMICAL Co. (Belgium) and ACROS (Belgium) unless otherwise specified. All materials were used without further purification unless otherwise specified.

Thermoline PET/V109 was used as a substrate. It refers to a subbed polyester substrate having a thickness of 120 µm.

Silver oxide ($Ag_2O$) was prepared by the precipitation of silver nitrate in an alkaline aqueous solution of sodium hydroxide (33 wt. %) followed by filtration and drying.

Ascorbic acid, from UCB PFIZER MERCK.

DMDT, 2,5-dimercapto-1,3,4-thiadiazole from ROBINSON BROTHERS LTD.

DCM, dichloromethane or methylenechloride ($CH_2C_{12}$) from ACROS.

MOP, 1-methoxy-2-propanol from ACROS.

Trifluoromethanesulphonic acid from ALDRICH.

n-decane from ALDRICH.

SA-01 is the abbreviation for oxalic acid (ethanedioic acid, CAS 144-62-7).

SA-02 is the abbreviation for malonic acid (propanedioic acid, CAS 141-82-2).

SA-03 is the abbreviation for succinic acid (butanedioic acid, CAS 110-15-6)

SA-04 is the abbreviation for glutaric acid (pentanedioic acid, CAS 110-94-1).

SA-05 is the abbreviation for formic acid (CAS 64-18-6).

SA-06 is the abbreviation for ascorbic acid (CAS 50-81-7).

SA-07 is the abbreviation for adipic acid (CAS 124-04-9).

Sintering additives oxalic acid, malonic acid, succinic acid, glutaric acid, adipic acid, formic acid and ascorbic acid were used as received.

Measurement Methods

1. Conductivity

The surface resistance (SER) of the conductive coated layers was measured in a room conditioned to a temperature of 25° C. and 30% relative humidity by contacting the coated layer with parallel copper electrodes of equal width and at distance equal to their width, treated with silver filled rubber contact material, each 35 mm long and 35 mm apart and capable of forming line contacts, the electrodes being separated by a Teflon® insulator. This enabled a direct measurement of the SER to be performed when coated layers were slitted at equal width as the electrodes. The conductivity, expressed as percentage of the bulk silver conductivity (% bulk silver), was calculated according to the following formula:

Conductivity=$100 \times \sigma/\sigma_{(Ag)}$=$100/[SER*h*\sigma_{(Ag)}] \times 1E5$ wherein σ is the specific conductivity of the layer expressed in S/cm, SER is the surface resistance of the layer expressed in Ohm·square, h the dry layer thickness expressed in micrometer, and $\sigma_{(Ag)}$ is the silver specific conductivity equal to 6.3 $10^5$ S/cm.

Example 1

1.1 Preparation of Polymeric Dispersant PD-01

868 g of 1,3-dioxolane was dissolved in 886 g of DCM in a 2 L three-neck round-bottom flask and stirred at room temperature under nitrogen atmosphere. 70.4 g of DMDT and 10 g of n-decane were added to the flask. After 10 minutes of constant stirring, 2.2 g of trifluoromethanesulphonic acid was added to the reaction mixture and stirred for 24 hours at 23° C. 6.1 g of triethylamine were added to the reaction mixture. ⅔ of the reaction mixture was precipitated into 6 l of cold n-hexane under mechanical stirring. The precipitated product was filtrated over Buchner and dried in a vacuum oven at 23° C. 490 g of polymeric dispersant PD-01 was recovered as a white-yellowish powder (yield=78%).

The number-average and z-average molecular weights (Mn, Mz) and polydispersity index (Mw/Mn) of the polymeric dispersant PD-01 as determined by size exclusion chromatography using dimethyl acetamide/0.21 wt. % LiCl/0.63 wt. % acetic acid as an eluent and 3 mixed-B columns which were calibrated against linear polystyrene standards were 5443, 8502 and 1.26, respectively.

1.2 Preparation of Polymeric Dispersant PD-02

250 g of 1,3-dioxolane were dissolved in 225 g of DCM in a 1 L three-neck round-bottom flask and stirred at room temperature under nitrogen atmosphere. 21.1 g of DMDT and 5 g of n-decane were added to the flask. After 10 minutes of constant stirring, 1.3 g of trifluoromethanesulphonic acid were added to the reaction mixture and stirred for 4 hours at 23° C. 1.8 mL of triethylamine was added to the reaction mixture. The solvent was evaporated under reduced pressure. 236.1 g of polymeric dispersant PD-02 were recovered as a white-yellowish viscous paste (yield=87.1%).

The number-average and z-average molecular weights (Mn, Mz) and polydispersity index (Mw/Mn) of the polymeric dispersant PD-02 as determined by size exclusion chromatography using dimethyl acetamide/0.21 wt. % LiCl/0.63 wt. % acetic acid as an eluent and 3 mixed-B columns which were calibrated against linear polystyrene standards were 4853, 7601 and 1.26, respectively.

Example 2

This example illustrates the preparation of the Metallic Nanodispersions (MNPD) according to a preferred embodiment of the present invention. Table 2 shows the composition of each MNPD.

2.1 Preparation of a Metallic Nanodispersion MNPD-01

6 g of silver oxide and 1.28 g of PD-01 were stirred in 28.72 g of MOP (grey suspension) in a 125 mL reactor for 15 minutes at 40° C. 1.2 mL of formic acid were added to the reaction mixture at 40° C. by using an automated syringe (flow=0.2 mL/min). 35.5 g of an homogenous black dispersion was produced with a composition Ag/PD-01/MOP of 15.7/3.6/80.7 wt:wt.

2.2 Preparation of a Metallic Nanodispersion MNPD-02

6.0 g of silver oxide and 1.28 g of PD-01 were stirred in 28.72 g of MOP (grey suspension) in a 125 mL reactor for 15 minutes at 40° C. 0.9 mL of formic acid were added to the reaction mixture at 40° C. by using an automated syringe (flow=0.2 mL/min). 35.5 g of an homogenous black dispersion was produced with a composition Ag/PD-01/MOP of 15.7/3.6/80.7 wt:wt.

2.3 Preparation of a Metallic Nanodispersion MNPD-03

5.0 g of silver oxide and 1.55 g of PD-01 were stirred in 56.0 g of MOP (grey suspension) in a 125 mL reactor thermostated at 40° C. for 15 minutes. 1.63 mL of formic acid were added to the reaction mixture at 40° C. by using an automated syringe (flow=0.2 mL/min). After complete addition of the reducing agent, the reaction mixture was stirred at 40° C. for 60 minutes and the solvent evaporated under reduced pressure. The paste was re-dispersed in MOP by vigorous stirring overnight. 31.0 g of a homogeneous black dispersion was produced with a composition Ag/PD-01/MOP 15.0/5.0/80.0 wt:wt.

2.4 Preparation of a Metallic Nanodispersion MNPD-04

6.0 g of silver oxide and 1.28 g of PD-01 were stirred in 29.02 g of MOP (grey suspension) in a 125 mL reactor for 15 minutes at 40° C. 0.9 mL of formic acid were added to the reaction mixture at 40° C. by using an automated syringe (flow=0.2 mL/min). After complete addition of the reducing agent, the reaction mixture was stirred at 40° C. for 120 minutes. 36.0 g of an homogenous black dispersion was produced with a composition Ag/PD-01/MOP of 15.7/3.6/80.7 wt:wt.

2.5 Preparation of a Metallic Nanodispersion MNPD-05

12.0 g of silver oxide and 2.56 g of PD-01 were stirred in 57.4 g of MOP (grey suspension) in a 250 mL reactor for 15 minutes at 40° C. 1.8 mL of formic acid were added to the reaction mixture at 40° C. by using an automated syringe (flow=0.2 mL/min). The reaction mixture was stirred at 40° C. for 2 additional hours. 71.1 g of an homogenous black dispersion was produced with a composition Ag/PD-01/MOP of 15.7/3.6/80.7 wt:wt.

2.6 Preparation of a Metallic Nanodispersion MNPD-06

45.0 g of silver oxide and 13.97 g of PD-02 were stirred in 1062.0 g of MOP (grey suspension) in a 2 L reactor thermostated at 40° C. for 15 minutes. 7.32 mL of formic acid were added to the reaction mixture at 40° C. by using an automated syringe (flow=150 mL/min). After complete addition of the reducing agent, the reaction mixture was stirred at 40° C. for 120 minutes and the solvent evaporated under reduced pressure. The paste was re-dispersed in MOP by vigorous stirring for 48 hours and placed in an ultrasonication bath for 10 minutes prior to use, in order to produce an homogeneous black dispersion with a composition Ag/PD-02/MOP 15.0/5.0/80.0 wt:wt.

Acid formic was used as reducing agent in the preparation of all MNDP's but is not present in the final dispersion due to its evaporation from the media.

TABLE 2

| Nanoparticles dispersion | Dispersant | wt. % Ag particles | wt. % Ag particles/wt. % dispersant | Solvent |
|---|---|---|---|---|
| MNPD-01 | PD-01 | 15.7 | 4.4 | MOP |
| MNPD-02 | PD-01 | 15.7 | 4.4 | MOP |
| MNPD-03 | PD-01 | 15.0 | 3.0 | MOP |
| MNPD-04 | PD-01 | 15.7 | 4.4 | MOP |
| MNPD-05 | PD-01 | 15.7 | 4.4 | MOP |
| MNPD-06 | PD-02 | 15.0 | 3.0 | MOP |

Example 3

This example illustrates the preparation of metallic compositions (CI). Inventive (INV) and comparative (COMP) compositions CI were prepared by the addition of compounds SA-01 to SA-07 to the metallic nanodispersions MNPD-01 to MNPD-06 (see Table 3). Inventive compositions comprise oxalic acid (SA-01), malonic acid (SA-02), succinic acid (SA-03) or glutaric acid (SA-04), while comparative compositions comprise no acid, adipic acid (SA-07), formic acid (SA-05) or ascorbic acid (SA-06). The amount of SA is expressed in wt. % of the composition and in wt:wt of the polymeric dispersant (PD-01 or PD-02).

The metallic compositions CI-01 to CI-18 were prepared with different additives (SA-01 to SA-07) and different metallic nanodispersions (MNDP-01 to MNDP-06). The additives SA were added in different concentrations to the referred compositions.

TABLE 3

| Compositions | MNPD | Silver (wt. %) | SA | SA (wt. %) | SA/PD wt:wt |
|---|---|---|---|---|---|
| CI-01 (INV) | MNPD-02 | 15.1 | SA-01 | 3.7 | 1.0 |
| CI-02 (INV) | MNPD-04 | 15.2 | SA-01 | 3.3 | 1.0 |
| CI-03 (INV) | MNPD-02 | 15.2 | SA-02 | 3.0 | 0.82 |
| CI-04 (INV) | MNPD-02 | 15.2 | SA-03 | 3.5 | 0.95 |
| CI-05 (INV) | MNPD-02 | 15.1 | SA-04 | 3.8 | 1.05 |
| CI-06(COMP) | MNPD-05 | 15.0 | SA-07 | 4.2 | 1.22 |
| CI-07(COMP) | MNPD-01 | 15.7 | — | 0 | 0 |
| CI-08 (INV) | MNPD-01 | 15.3 | SA-01 | 2.2 | 0.61 |
| CI-09 (INV) | MNPD-01 | 15.2 | SA-01 | 2.9 | 0.79 |
| CI-10 (INV) | MNPD-01 | 15.1 | SA-01 | 3.7 | 1.0 |
| CI-11 (INV) | MNPD-01 | 15.0 | SA-01 | 4.4 | 1.21 |
| CI-12 (INV) | MNPD-01 | 14.9 | SA-01 | 5.1 | 1.42 |
| CI-13 COMP) | MNPD-03 | 15.0 | — | 0 | 0 |
| CI-14(COMP) | MNPD-03 | 14.3 | SA-05 | 4.8 | 1.0 |
| CI-15(COMP) | MNPD-01 | 15.1 | SA-06 | 3.7 | 1.0 |
| CI-16(COMP) | MNPD-05 | 15.7 | — | 0 | 0 |
| CI-17(COMP) | MNPD-06 | 15.0 | — | 0 | 0 |
| CI-18 (INV) | MNPD-06 | 14.4 | SA-01 | 3.8 | 0.8 |

Example 4

This example illustrates de preparation of coated layers from metallic compositions.

Coated layers (CL) were prepared by applying the metallic compositions CI-01 to CI06, as defined in Table 4, onto a subbed polyester substrate having a thickness of 63 μm. The compositions were applied at a wet coating thickness of 20 μm, dried at 23° C. for 10 minutes. The composition and electrical properties of the layers CL-01 to CL-06 and CL-09, after curing at 170° C. during 10 minutes, are given in Table 4.

TABLE 4

| CL | CI | SA | Temp. (°C.) | Time (min) | Resistivity (Ohm/square) | Conductivity (% bulk Ag) |
|---|---|---|---|---|---|---|
| CL-01(INV) | CI-01 | SA-01 | 170 | 10 | 1 | 4.0 |
| CL-02(INV) | CI-02 | SA-01 | 170 | 10 | 1 | 4.0 |
| CL-03(INV) | CI-03 | SA-02 | 170 | 10 | 2 | 2.1 |
| CL-04(INV) | CI-04 | SA-03 | 170 | 10 | 4 | 1.3 |
| CL-05(INV) | CI-05 | SA-04 | 170 | 10 | 3 | 1.5 |
| CL-06(COMP) | CI-06 | SA-07 | 170 | 10 | 20·10$^6$ | 0 |
| CL-09(COMP) | CI-07 | No SA | 170 | 10 | 144 | 0 |

The layers coated from the conductive compositions comprising the dicarboxylic acid according to a preferred embodiment of the present invention exhibit higher conductivity than the ones comprising comparative carboxylic acids when cured under the same conditions. It is clear that only the compositions according to preferred embodiments of the present invention allow a significant lowering of the curing temperature.

Example 5

This example illustrates the preparation of comparative coated layers from the metallic composition CI-06 using the SA-07 and cured during 10 minutes at different temperatures below the conventional curing temperatures, such as 170° C., 180° C. and 200° C. The composition and electrical properties of the layers CL-06, CL-40 and CL-41, after curing are given in Table 5.

TABLE 5

| CL | CI | SA | Temp. (°C.) | Time (min) | Resistivity (Ohm/square) | Conductivity (% bulk Ag) |
|---|---|---|---|---|---|---|
| CL-06(COMP) | CI-06 | SA-07 | 170 | 10 | 20·10$^6$ | 0 |
| CL-40(COMP) | CI-06 | SA-07 | 180 | 10 | 7 | 0.6 |
| CL-41(COMP) | CI-06 | SA-07 | 200 | 10 | 4 | 1.2 |

The comparative layers coated from the metallic compositions comprising other acids than the dicarboxylic acids according to a preferred embodiment of the present invention exhibit lower or no conductivity when cured in the preferred conditions of the invention, i.e. at a temperature of 200° C. or below and during 10 minutes. Only when the temperature is 200° C. the comparative layers may present some conductivity (as shown with CL-41) and even then the conductivity values of comparative compositions are lower than the ones of the coated layers from the compositions of the present invention at a temperature of 170° C., as shown in Table 4, where the lowest conductivity value for an inventive composition is 1.3% bulk Ag referring to CL-04. Therefore, it is clear that only the compositions according to preferred embodiments of the present invention may maintain or increase the conductivity when there is a significant lowering of the curing temperature and curing time.

Example 6

This example illustrates the composition and electrical properties of the layers CL-07 to CL-36, coated with metallic compositions comprising variable concentrations of SA and cured at a temperature of 170° C. and variable curing times, from 2 to 30 minutes (Table 6).

TABLE 6

| CL | CI | SA | SA/PD (wt:wt) | Temp. (°C.) | Time (min) | Resistivity (Ohm/square) | Conductivity (% bulk Ag) |
|---|---|---|---|---|---|---|---|
| CL-07 (COMP) | CI-07 | No SA | | 170 | 2 | 1169 | 0.0 |
| CL-08 (COMP) | CI-07 | No SA | | 170 | 5 | 436 | 0.0 |
| CL-09 (COMP) | CI-07 | No SA | | 170 | 10 | 144 | 0.0 |
| CL-10 (COMP) | CI-07 | No SA | | 170 | 30 | 53 | 0.1 |
| CL-11 (INV) | CI-08 | SA-01 | (0.61) | 170 | 2 | 3 | 1.8 |
| CL-12 (INV) | CI-08 | SA-01 | (0.61) | 170 | 5 | 3 | 1.9 |
| CL-13 (INV) | CI-08 | SA-01 | (0.61) | 170 | 10 | 2 | 2.4 |
| CL-14 (INV) | CI-08 | SA-01 | (0.61) | 170 | 30 | 3 | 1.4 |
| CL-15 (INV) | CI-09 | SA-01 | (0.79) | 170 | 2 | 2 | 2.5 |
| CL-16 (INV) | CI-09 | SA-01 | (0.79) | 170 | 5 | 2 | 2.7 |
| CL-17 (INV) | CI-09 | SA-01 | (0.79) | 170 | 10 | 2 | 2.3 |
| CL-18 (INV) | CI-09 | SA-01 | (0.79) | 170 | 30 | 2 | 2.7 |
| CL-19 (INV) | CI-10 | SA-01 | (1.0) | 170 | 2 | 2 | 2.7 |
| CL-20 (INV) | CI-10 | SA-01 | (1.0) | 170 | 5 | 1 | 3.4 |
| CL-21 (INV) | CI-10 | SA-01 | (1.0) | 170 | 10 | 2 | 2.7 |
| CL-22 (INV) | CI-10 | SA-01 | (1.0) | 170 | 30 | 2 | 2.0 |
| CL-23 (INV) | CI-11 | SA-01 | (1.21) | 170 | 2 | 3 | 1.9 |
| CL-24 (INV) | CI-11 | SA-01 | (1.21) | 170 | 5 | 2 | 2.2 |
| CL-25 (INV) | CI-11 | SA-01 | (1.21) | 170 | 10 | 2 | 2.4 |
| CL-26 (INV) | CI-11 | SA-01 | (1.21) | 170 | 30 | 3 | 1.8 |
| CL-27 (INV) | CI-12 | SA-01 | (1.42) | 170 | 2 | 2 | 2.0 |
| CL-28 (INV) | CI-12 | SA-01 | (1.42) | 170 | 5 | 2 | 2.7 |
| CL-29 (INV) | CI-12 | SA-01 | (1.42) | 170 | 10 | 2 | 2.3 |
| CL-30 (INV) | CI-12 | SA-01 | (1.42) | 170 | 30 | 2 | 2.3 |
| CL-31 (COMP) | CI-13 | No SA | | 170 | 10 | 20·10$^6$ | 0.0 |
| CL-32 (COMP) | CI-14 | SA-05 | (1.0) | 170 | 10 | 20·10$^6$ | 0.0 |
| CL-33 (COMP) | CI-15 | SA-06 | (1.0) | 170 | 10 | 5 | 1.0 |

From Table 6, it is clear that coated layers with sufficient conductivity (bulk silver>1%) can be prepared by using the conductive compositions according to a preferred embodiment of the present invention when using curing temperature of 170° C. and curing times between 2 and 30 minutes.

Furthermore, it is also clear that layers coated with the conductive compositions according to a preferred embodiment of the present invention comprising different concentration of SAs within the range of the present invention (SA/PD between 0.6 and 1.42) exhibit sufficient conductivity at a curing temperature of 170° C. and curing times between 2 and 30 minutes.

However, layers coated with comparative compositions having no SA, respectively CL-07 to CL-10 and CL-31, show no conductivity at the same curing conditions: temperature of 170° C. and curing times between 2 and 30 minutes.

Example 7

This example illustrates the composition and electrical properties of coated layers with metallic compositions comprising variable concentrations of SA and cured at a temperature of 170° C. during 10 minutes (Table 7).

TABLE 7

| CL | CI | SA/PD (wt:wt) | Temp. (° C.) | Time (min) | Resistivity (Ohm/square) | Conductivity (% bulk Ag) |
|---|---|---|---|---|---|---|
| CL-13 (INV) | CI-08 | SA-01 (0.61) | 170 | 10 | 2 | 2.4 |
| CL-17 (INV) | CI-09 | SA-01 (0.79) | 170 | 10 | 2 | 2.3 |
| CL-21 (INV) | CI-10 | SA-01 (1.0) | 170 | 10 | 2 | 2.7 |
| CL-25 (INV) | CI-11 | SA-01 (1.21) | 170 | 10 | 2 | 2.4 |
| CL-29 (INV) | CI-12 | SA-01 (1.42) | 170 | 10 | 2 | 2.3 |
| CL-09 (COMP) | CI-07 | No SA | 170 | 10 | 144 | 0.0 |
| CL-31 (COMP) | CI-13 | No SA | 170 | 10 | $20 \cdot 10^6$ | 0.0 |
| CL-32 (COMP) | CI-14 | SA-05 (1.0) | 170 | 10 | $20 \cdot 10^6$ | 0.0 |
| CL-33 (COMP) | CI-15 | SA-06 (1.0) | 170 | 10 | 5 | 1.0 |

From Table 7, it is clear that coated layers with sufficient conductivity can be prepared by using the conductive compositions according to a preferred embodiment of the present invention, within the claimed concentration range (SA/PD between 0.6 and 1.42) at a curing temperature of 170° C. and curing time of 10 minutes, whilst layers coated with comparative metallic compositions, having no SA (CL-09 and CL-31) or layers coated with comparative metallic compositions comprising formic acid (SA-05) or ascorbic acid (SA-06), and with SA/PD=1.0 wt:wt, respectively CL-32 and CL-33, exhibit little or no conductivity under the same curing conditions.

Example 8

The composition and electrical properties of the layers CL-21 and CL-35 to CL-39 coated with metallic compositions and after a curing time of 10 minutes at variable curing temperatures are given in Table 8.

TABLE 8

| CL | CI | SA/PD wt:wt | Temp (° C.) | Time (min) | SER (Ohm/square) | Conductivity (% bulk Ag) |
|---|---|---|---|---|---|---|
| CL-35 (COMP) | CI-16 | No SA | 170 | 10 | $20 \cdot 10^6$ | 0 |
| CL-36 (COMP) | CI-16 | No SA | 180 | 10 | $27 \cdot 10^6$ | 0 |
| CL-37 (COMP) | CI-16 | No SA | 200 | 10 | 75 | 0.1 |
| CL-21 (INV) | CI-10 | SA-01 (1.0) | 170 | 10 | 2 | 2.7 |
| CL-38 (COMP) | CI-17 | No SA | 130 | 10 | 200,000* | 0* |
| CL-39 (INV) | CI-18 | SA-01 (0.8) | 130 | 10 | 21.4* | 0.1* |

*40 μm wet coating.

From Table 8, it is clear that conductive layers with sufficient conductivity can be prepared by using the conductive compositions according to a preferred embodiment of the present invention when using curing temperature below 200° C.

The layers coated or printed with the conductive compositions according to a preferred embodiment of the present invention exhibit superior performance when compared to layers coated or printed with comparative compositions under the same curing conditions.

The preferred embodiments of the inventive compositions allows a significant reduction of the curing time at a given temperature.

It is also clear that the advantageous technical effect of the sintering additives used in the conductive compositions of the present invention is independent of the polymeric dispersant amount, as long as the indicated dosage is respected.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A composition comprising:
a dispersion including metallic nanoparticles, metal oxide nanoparticles, or metal precursor nanoparticles;
a polymeric dispersant including (i) a polyacetal or a polyacetal/polyether backbone, and (ii) an anchor group with an affinity for the metallic nanoparticles, the metal oxide nanoparticles, or the metal precursor nanoparticles that is chemically bonded to the polyacetal or polyacetal/polyether backbone, the polymeric dispersant having 95 wt. % decomposition at a temperature below 300° C.;
an optional dispersion medium; and
a sintering additive; wherein
the sintering additive is a dicarboxylic acid according to the formula HOOC—$X_a$—COOH, wherein a is 0 or 1, and X is an optionally substituted $C_1$-$C_3$ alkylene group; and
wherein the anchor group of the polymeric dispersant is represented by Formulae II, III, IV, or V,

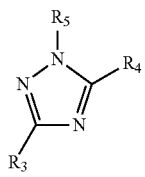

Formula II

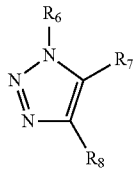

Formula III

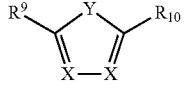

Formula IV

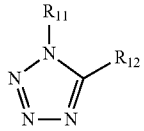

Formula V wherein $R_3$, $R_4$, $R_7$, $R_8$, $R_9$, $R_{10}$, and $R_{12}$ independently represent a halogen, an optionally substituted thiol, a hydroxyl, a carboxylic acid, an aldehyde, an ester, an amide, a primary amine, a secondary amine, a tertiary amine, or an optionally substituted alkyl, aryl, aralkyl, or alkylene group;

$R_7$ and $R_8$ is optionally linked and form a ring structure;

$R_5$, $R_6$, $R_{11}$ independently represent a halogen, an optionally substituted thiol, a carboxylic acid, a primary amine, a secondary amine, a tertiary amine, or an optionally substituted alkyl, aryl, or aralkyl group;

X independently represents a —N—, a —CH—, or a —C($CR_{13}$)— and wherein $R_{13}$ represents a methyl, an optionally substituted alkyl, aryl, or aralkyl group and where X is optionally linked to $R_9$ or $R_{10}$ and form a ring structure; and Y represents oxygen, sulphur, or —$NR_{14}$—, wherein $R_{14}$ represents a methyl, or an optionally substituted alkyl, aryl, or aralkyl group.

2. The composition according to claim 1, wherein the sintering additive is a dicarboxylic acid according to the formula HOOC—$(CH_2)_b$—COOH, wherein b is 0, 1, 2, or 3.

3. The composition according to claim 1, wherein the sintering additive is oxalic acid or malonic acid.

4. The composition according to claim 1, wherein a concentration of the sintering additive, expressed as a weight ratio of the sintering additive to the polymeric dispersant, is between 0.6 and 1.5.

5. The composition according to claim 1, wherein the polyacetal or polyacetal/polyether backbone is an aliphatic polyacetal or polyacetal/polyether selected from:
a) —$(CH_2—O)_n$—
b) —$(CH_2—CH_2—O—CH_2—O)_n$—
c) —$(CH_2—CH_2—CH_2—O—CH_2—O)_n$—
d) —$(CH_2—CH_2—CH_2—CH_2—O—CH_2—O)_n$—
e) —$(CH_2—CH_2—O)_n$—
f) —$(CH_2—CHCH_3—O)_n$—
g) —$(CH_2—CH_2—CH_2—O)_n$—
h) —$(CH_2—CH_2—CH_2—CH_2—O)_n$—
i) —$(CH_2—CH_2—CH_2—CH_2—CH_2—O)_n$—
j) —$(CH_2—CH_2—CH_2—CH_2—CH_2—CH_2—O)_n$—
wherein n is an integer between 14 and 500.

6. The composition according to claim 1, wherein the polyacetal or polyacetal/polyether backbone is represented by Formula I:

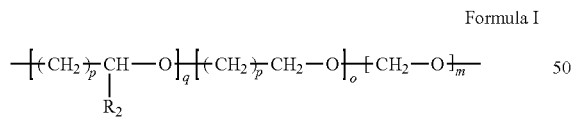

Formula I wherein
m is an integer between 1 and 500;
o is an integer between 0 and 340;
q is an integer between 0 and 250;
p is an integer between 1 and 7;
m+o+q is an integer between 14 and 500; and
$R_2$ represents a hydrogen, a methyl, or an optionally substituted alkyl group.

7. The composition according to claim 1, wherein an average numerical molecular weight of the polymeric dispersant is between 1500 and 6000 Da.

8. The composition according to claim 1, further comprising at least 1 wt. % of the metallic nanoparticles, the metal oxide nanoparticles, or the metal precursor nanoparticles.

9. A method of preparing a composition, comprising the steps of:
a) providing a dispersion including:
metallic nanoparticles, metal oxide nanoparticles, or metal precursor nanoparticles;
a polymeric dispersant including (i) a polyacetal or a polyacetal/polyether backbone, and (ii) an anchor group with an affinity for the metallic nanoparticles, the metal oxide nanoparticles, or the metal precursor nanoparticles that is chemically bonded to the polyacetal or polyacetal/polyether backbone, the polymeric dispersant having 95 wt. % decomposition at a temperature below 300° C.; and
a dispersion medium; and
b) adding a sintering additive to the dispersion; wherein the sintering additive is a dicarboxylic acid according to the formula HOOC—$X_a$—COOH, wherein a is 0 or 1, and X is an optionally substituted $C_1$-$C_3$ alkylene group; and
wherein the anchor group of the polymeric dispersant is represented by Formulae II, III, IV, or V,

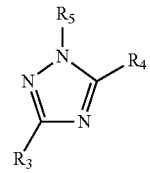

Formula II

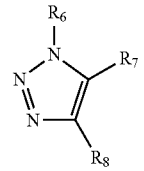

Formula III

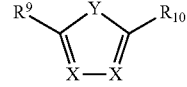

Formula IV

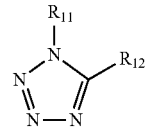

Formula V wherein $R_3$, $R_4$, $R_7$, $R_8$, $R_9$, $R_{10}$, and $R_{12}$ independently represent a halogen, an optionally substituted thiol, a hydroxyl, a carboxylic acid, an aldehyde, an ester, an amide, a primary amine, a secondary amine, a tertiary amine, or an optionally substituted alkyl, aryl, aralkyl, or alkylene group;

$R_7$ and $R_8$ is optionally linked and form a ring structure;

$R_5$, $R_6$, $R_{11}$ independently represent a halogen, an optionally substituted thiol, a carboxylic acid, a primary amine, a secondary amine, a tertiary amine, or an optionally substituted alkyl, aryl, or aralkyl group;

X independently represents a —N—, a —CH—, or a —C($CR_{13}$)— and wherein $R_{13}$ represents a methyl, an optionally substituted alkyl, aryl, or aralkyl group and where X is optionally linked to $R_9$ or $R_{10}$ and form a ring structure; and Y represents oxygen, sulphur, or —$NR_{14}$—, wherein $R_{14}$ represents a methyl, or an optionally substituted alkyl, aryl, or aralkyl group.

10. The method for preparing a composition according to claim 9, wherein in step a) a first dispersion medium is used, and the method further comprises the following steps between step a) and b):
- removing the first dispersion medium at least partially by evaporation so as to obtain a high viscous paste; and
- re-dispersing the high viscous paste in a second dispersion medium; wherein
- the first and second dispersion mediums are the same.

11. A method of preparing a conductive layer or pattern comprising applying the composition as defined in claim 1 to a substrate followed by curing the applied composition.

12. The method of preparing a conductive layer or pattern as defined in claim 11, wherein a curing time for the applied composition is less than 30 minutes and a curing temperature is below 200° C.

13. The method of preparing a conductive layer or pattern according to claim 12, wherein the curing time is between 2 and 20 minutes.

14. The method of preparing a conductive layer or pattern according to claim 12, wherein the curing temperature is between 130° C. and 180° C.

15. The method of preparing a conductive layer or pattern according to claim 13, wherein the curing temperature is between 130° C. and 180° C.

\* \* \* \* \*